United States Patent
Yu et al.

(10) Patent No.: US 12,333,817 B2
(45) Date of Patent: Jun. 17, 2025

(54) ASSOCIATION OF CAMERA IMAGES AND RADAR DATA IN AUTONOMOUS VEHICLE APPLICATIONS

(71) Applicant: Waymo LLC, Mountain View, CA (US)

(72) Inventors: Ruichi Yu, Mountain View, CA (US); Shiwei Sheng, Cupertino, CA (US); Kang Li, Sammamish, WA (US); Xu Chen, Livermore, CA (US)

(73) Assignee: Waymo LLC, Mountain View, CA (US)

( * ) Notice: Subject to any disclaimer, the term of this patent is extended or adjusted under 35 U.S.C. 154(b) by 588 days.

(21) Appl. No.: 17/444,338

(22) Filed: Aug. 3, 2021

(65) Prior Publication Data

US 2023/0038842 A1    Feb. 9, 2023

(51) Int. Cl.
*G06V 20/56*    (2022.01)
*G01S 7/41*    (2006.01)
(Continued)

(52) U.S. Cl.
CPC .............. *G06V 20/56* (2022.01); *G01S 7/417* (2013.01); *G01S 13/867* (2013.01);
(Continued)

(58) Field of Classification Search
CPC ...... G06N 20/20; G06N 3/045; G06N 3/0464; G06N 3/084; G01S 2013/9322; G01S 2013/9319; G01S 2013/93185; G01S 2013/9318; G01S 13/865; G01S 13/862; G01S 13/89; G01S 2013/932;
(Continued)

(56) References Cited

U.S. PATENT DOCUMENTS

| 11,618,480 | B2 * | 4/2023 | Imran | ................... | G06V 20/58 |
| | | | | | 701/28 |
| 2019/0147331 | A1 * | 5/2019 | Arditi | ................... | G01C 21/32 |
| | | | | | 706/20 |

(Continued)

OTHER PUBLICATIONS

Sengupta, Arindam, Feng Jin, and Siyang Cao. "A DNN-LSTM based target tracking approach using mmWave radar and camera sensor fusion." 2019 IEEE national aerospace and electronics conference (NAECON). (Year: 2019).*

(Continued)

*Primary Examiner* — Andrae S Allison
*Assistant Examiner* — Emmanuel Silva-Avina
(74) *Attorney, Agent, or Firm* — Lowenstein Sandler LLP

(57) ABSTRACT

The described aspects and implementations enable fast and accurate object identification in autonomous vehicle (AV) applications by combining radar data with camera images. In one implementation, disclosed is a method and a system to perform the method that includes obtaining a radar image of a first hypothetical object in an environment of the AV, obtaining a camera image of a second hypothetical object in the environment of the AV, and processing the radar image and the camera image using one or more machine-learning models MLMs to obtain a prediction measure representing (Continued)

a likelihood that the first hypothetical object and the second hypothetical object correspond to a same object in the environment of the AV.

20 Claims, 11 Drawing Sheets

(51) Int. Cl.
  *G01S 13/86* (2006.01)
  *G01S 13/931* (2020.01)
  *G06F 18/25* (2023.01)
  *G06N 20/20* (2019.01)
(52) U.S. Cl.
  CPC .......... *G01S 13/931* (2013.01); *G06F 18/251* (2023.01); *G06N 20/20* (2019.01)
(58) Field of Classification Search
  CPC ...... G01S 13/584; G01S 13/87; G01S 13/931; G01S 13/867; G01S 7/417; G06V 20/56; G06V 10/811; G06V 10/82
  USPC .......................................................... 382/103
  See application file for complete search history.

(56) References Cited

U.S. PATENT DOCUMENTS

| | | | |
|---|---|---|---|
| 2019/0147610 A1* | 5/2019 | Frossard | G06N 3/045 |
| | | | 382/103 |
| 2020/0127386 A1 | 4/2020 | Yekan et al. | |
| 2020/0142026 A1 | 5/2020 | Bush et al. | |
| 2020/0175315 A1* | 6/2020 | Gowaikar | G06F 18/213 |
| 2021/0133582 A1 | 5/2021 | Refaat et al. | |
| 2021/0231794 A1* | 7/2021 | Song | G06F 18/251 |
| 2021/0406679 A1 | 12/2021 | Wen et al. | |
| 2022/0130109 A1* | 4/2022 | Arbabian | G08B 23/00 |
| 2022/0373683 A1* | 11/2022 | Moriizumi | G01S 17/86 |
| 2022/0415059 A1 | 12/2022 | Smolyanskiy et al. | |
| 2023/0008015 A1* | 1/2023 | Bodnariuc | G06V 10/25 |
| 2023/0204755 A1* | 6/2023 | Liu | G01S 7/412 |
| | | | 342/55 |

OTHER PUBLICATIONS

Dong, X., Zhuang, B., Mao, Y., & Liu, L. (2021). Radar camera fusion via representation learning in autonomous driving. In Proceedings of the IEEE/CVF conference on computer vision and pattern recognition (pp. 1672-1681). (Year: 2021).*

* cited by examiner

ASSOCIATION OF CAMERA IMAGES AND RADAR DATA IN AUTONOMOUS VEHICLE APPLICATIONS

TECHNICAL FIELD

The instant specification generally relates to autonomous vehicles. More specifically, the instant specification relates to improving autonomous driving systems and components using machine-learning models to associate camera images with radar data for efficient identification and tracking of objects in autonomous driving environments.

BACKGROUND

An autonomous (fully and partially self-driving) vehicle (AV) operates by sensing an outside environment with various electromagnetic (e.g., radar and optical) and non-electromagnetic (e.g., audio and humidity) sensors. Some autonomous vehicles chart a driving path through the environment based on the sensed data. The driving path can be determined based on Global Positioning System (GPS) data and road map data. While the GPS and the road map data can provide information about static aspects of the environment (buildings, street layouts, road closures, etc.), dynamic information (such as information about other vehicles, pedestrians, street lights, etc.) is obtained from contemporaneously collected sensing data. Precision and safety of the driving path and of the speed regime selected by the autonomous vehicle depend on timely and accurate identification of various objects present in the driving environment and on the ability of a driving algorithm to process the information about the environment and to provide correct instructions to the vehicle controls and the drivetrain.

BRIEF DESCRIPTION OF THE DRAWINGS

The present disclosure is illustrated by way of examples, and not by way of limitation, and can be more fully understood with references to the following detailed description when considered in connection with the figures, in which.

SUMMARY

Figure 1:
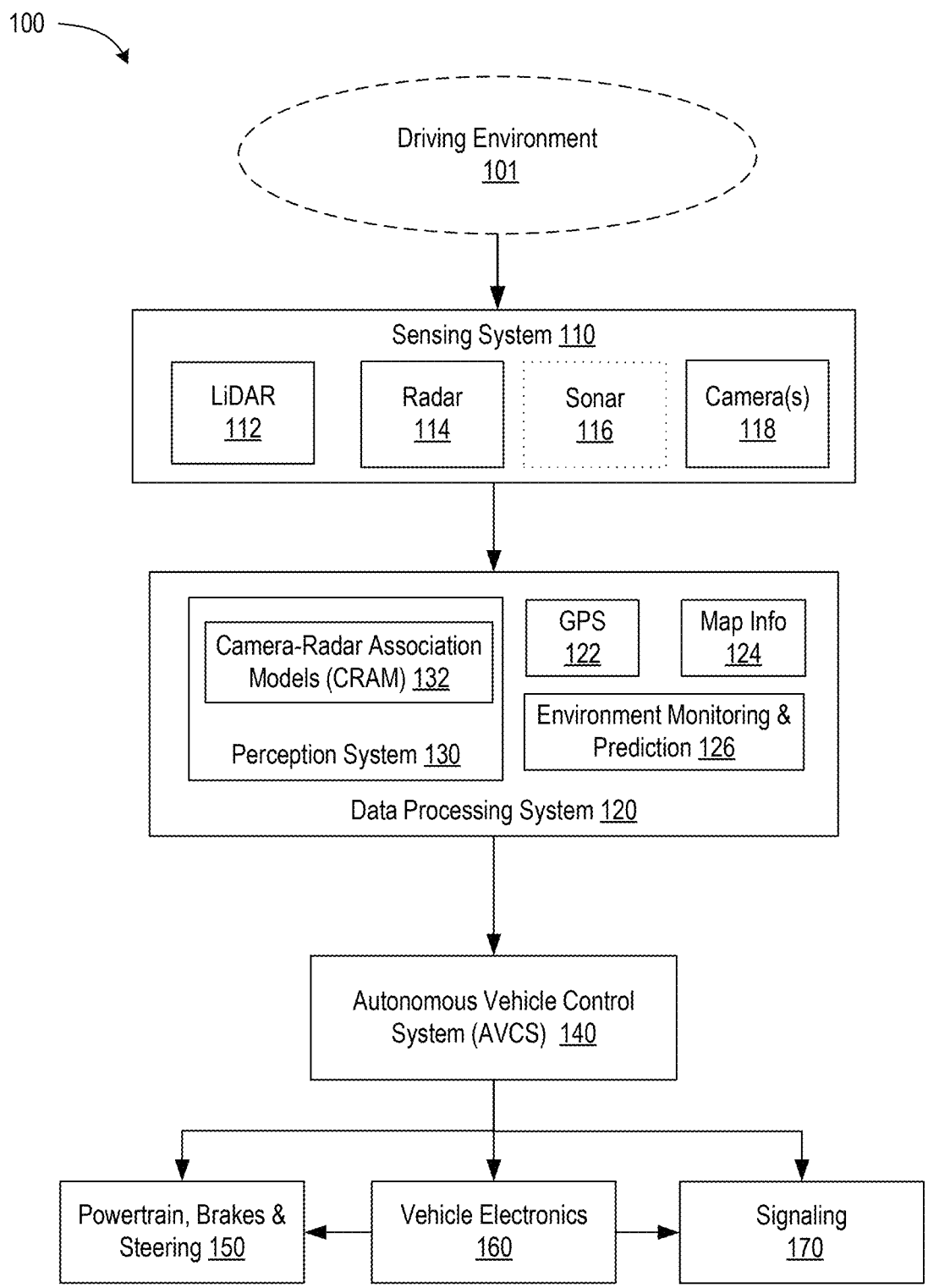
FIG. 1 is a diagram illustrating components of an example autonomous vehicle capable of combining radar data with camera images for fast and reliable object identification and tracking, in accordance with some implementations of the present disclosure.

In one implementation, disclosed is a method that includes obtaining, by a processing device, a first image, wherein the first image comprises a radar image of a first hypothetical object in an environment of an autonomous vehicle (AV); obtaining, by the processing device, a second image, wherein the second image comprises a camera image of a second hypothetical object in the environment of the AV; and processing the first image and the second image using one or more machine-learning models (MLMs) to obtain a prediction measure representing a likelihood that the first hypothetical object and the second hypothetical object correspond to a same object in the environment of the AV.

In another implementation, disclosed is a method of obtaining, by a processing device, radar data for a region of an environment of an autonomous vehicle (AV); obtaining, by the processing device, a camera image for the region of the environment of the AV; processing the radar data and the camera image using one or more machine-learning models (MLMs) to identify an object in the environment of the AV; determining, using the radar data, speed and location of the identified object; and causing a driving path of the AV to be determined in view of the speed and location of the identified object.

In another implementation, disclosed is a perception system of an autonomous vehicle (AV) to obtain a first image, wherein the first image comprises a radar image of a first hypothetical object in an environment of the AV; obtain a second image, wherein the second image comprises a camera image of a second hypothetical object in the environment of the AV; and process the first image and the second image using one or more machine-learning models (MLMs) to obtain a prediction measure representing a likelihood that the first hypothetical object and the second hypothetical object correspond to a same object in the environment of the AV.

DETAILED DESCRIPTION

An autonomous vehicle can employ a radio detection and ranging (radar) technology and light detection and ranging (lidar) technology to detect distances to various objects in the environment and the velocities of such objects. A sensor (a radar or lidar) emits one or more radio wave (or laser) signals (e.g., pulses) that travel to an object and then detects arrived signals reflected from the object. By determining a time delay between the signal emission and the arrival of the reflected waves, a sensor can determine the distance to the object. A typical sensor emits signals in multiple directions to obtain a wide view of the outside environment. For example, a sensor (radar or lidar) can cover an entire 360-degree view by using a series of consecutive sensing frames identified with timestamps. As a result, each sector in space is sensed in time increments $\Delta\tau$, which are determined by the angular velocity of the sensor's scanning speed. Sometimes, an entire 360-degree view of the environment can be obtained over a full scan. Alternatively, any smaller sector, e.g., a 1-degree sector, a 5-degree sector, a 10-degree sector, or any other sector can be scanned, as desired.

Each frame can include numerous return points (or simply "points") corresponding to reflections from various objects of the environment. Each point can be associated with the distance to the corresponding object or, more specifically, with the distance to an element of the reflective surface of the object (reflecting region) responsible for the respective return point. A set of points within a given frame can be referred to as a "point cloud." A point cloud can include returns from multiple objects. Typically, it is not known a priori how many objects are within a given frame and to what types (e.g., cars, trucks, buses, motorcycles, pedestrians, etc.) the objects in the frame belong.

Time-of-flight (ToF) sensors are typically used for ranging. ToFs can also be capable of determining the velocity (speed and direction of motion) of a return point by emitting two or more signals (e.g., as part of different sensing frames) in a quick succession and detecting the position of the reflecting surface as the surface moves with each additional frame. The intervals between successive signals (frames) can be short enough so that the object does not change its position appreciably in relation to other objects of the environment, but still long enough to allow the radar or lidar to detect accurately the changes in the object's position. Coherent sensors, e.g., frequency-modulated continuous wave (FMCW) radars and/or lidars take advantage of a phase information encoded into transmitted signals (and carried by the emitted electromagnetic waves to the target and back) and provide additional functionality. A coherent sensor detects changes in the frequency (and the accompanying phase) of the reflected wave induced by the motion of the reflecting surface, a phenomenon known as the Doppler effect. The frequency/phase of the reflected wave is sensitive to the component of the velocity of the reflecting surface $V_r$ that is parallel to the direction of the wave propagation, herein referred to as the "radial" velocity. A coherent sensor allows to associate a radial velocity with the return points of the point cloud. This additional information (which can be obtained separately or together with the range information) helps the sensing system of the autonomous vehicle to identify the state of the motion of various objects.

Radar and lidar sensors offer different advantages. A lidar uses waves with a much shorter wavelength than a radar and provides a much higher resolution than radar (the resolution is typically limited by the wavelength). On other hand, radars are less expensive, require less frequent maintenance, have a longer working range of distances, and better tolerate adverse environmental conditions, e.g., foggy, snowy, or misty driving conditions. Because of a significantly lower cost and complexity, more radar devices can be mounted on a vehicle and positioned at locations that (collectively) provide a wider field of view. For example, a view from a single lidar sensor mounted in the middle of the roof of a vehicle may be obscured by an obstacle (e.g., a doubly parked car or truck) whereas at least one of the radar sensors mounted on rear-view mirrors can still have a good view into the obscured portion of the roadway. Radar returns, having a longer wavelength, can often be unable to determine an exact nature of an object that reflects the radar signals, e.g., to differentiate a pedestrian from a road sign, a vehicle from a roadblock, to identify accurate boundaries of the roadway, and so on.

A camera (e.g., a photographic or video camera) allows a high resolution of objects at both shorter and longer distances but provides a projection of a three-dimensional space onto a two-dimensional image plane (or some other non-planar surface). A small depiction of an object in a camera image can belong to a small object located close to the camera or to a larger object located at a (proportionally) larger distance. Furthermore, a still camera image can be incapable of informing an autonomous vehicle's perception system as to the speed of the object. A time sequence of camera images can provide the information about the velocity of the object's motion but may require a substantial time for an accurate determination.

Aspects and implementations of the present disclosure address these and other shortcomings of the existing technologies by enabling methods and systems that reliably and rapidly associate camera data with radar data for faster and more accurate identification and tracking of objects in driving environments. More specifically, camera detection and radar detection have complementary advantages. While camera imaging has a high resolution, radar detection is capable of accurate distance and velocity identification. Challenges of combining camera images with radar data include the need to accurately associate three-dimensional (3D) radar data with two-dimensional (2D) camera outputs. Inaccurate mapping of the two sets of data onto each other may cause misidentifying a stationary close object as moving with a high speed (resulting in an unnecessary emergency braking), or in misidentifying a fast close object as stationary (resulting in a delayed braking), or the like. These challenges are addressed by various implementations of the present disclosure that deploy machine-learning models (MLMs) that are trained to accurately and quickly identify various visual depictions in camera images with return points of a radar cloud. In some implementations, a MLM can be trained to process a combined image that includes a camera image with an overlaid radar imaging data and to output a prediction whether an object depicted in the camera image and an object in the radar overlay represent the same object in the driving environment. In some implementations, various additional MLMs can facilitate accurate predictions. For example, another MLM can process the original camera image (without the radar overlay). Yet another MLM can process velocity (Doppler) data obtained by the radar. Outputs (embedding vectors) of the one or more such MLMs can be combined (e.g., concatenated) and processed by a final prediction (classifier) MLM. Advantages of the described implementations include fast and accurate object identification as well as distance/velocity determination. Such an improved perception of autonomous vehicles translates into safer, more comfortable, and more fuel-efficient autonomous driving.

FIG. 1 is a diagram illustrating components of an example autonomous vehicle (AV) 100 capable of combining radar data with camera images for fast and reliable object identification and tracking, in accordance with some implementations of the present disclosure. Autonomous vehicles can include motor vehicles (cars, trucks, buses, motorcycles, all-terrain vehicles, recreational vehicles, any specialized farming or construction vehicles, and the like), aircraft (planes, helicopters, drones, and the like), naval vehicles (ships, boats, yachts, submarines, and the like), or any other self-propelled vehicles (e.g., robots, factory or warehouse robotic vehicles, sidewalk delivery robotic vehicles, etc.) capable of being operated in a self-driving mode (without a human input or with a reduced human input).

A driving environment 101 can include any objects (animated or non-animated) located outside the AV, such as roadways, buildings, trees, bushes, sidewalks, bridges, mountains, other vehicles, pedestrians, and so on. The driving environment 101 can be urban, suburban, rural, and so on. In some implementations, the driving environment 101 can be an off-road environment (e.g. farming or other agricultural land). In some implementations, the driving environment can be an indoor environment, e.g., the environment of an industrial plant, a shipping warehouse, a hazardous area of a building, and so on. In some implementations, the driving environment 101 can be substantially flat, with various objects moving parallel to a surface (e.g., parallel to the surface of Earth). In other implementations, the driving environment can be three-dimensional and can include objects that are capable of moving along all three directions (e.g., balloons, leaves, etc.). Hereinafter, the term "driving environment" should be understood to include all environments in which an autonomous motion of self-propelled vehicles can occur. For example, "driving environment" can include any possible flying environment of an aircraft or a marine environment of a naval vessel. The objects of the driving environment 101 can be located at any distance from the AV, from close distances of several feet (or less) to several miles (or more).

The example AV 100 can include a sensing system 110. The sensing system 110 can include various electromagnetic (e.g., optical) and non-electromagnetic (e.g., acoustic) sensing subsystems and/or devices. The sensing system 110 can include a radar 114 (or multiple radars 114), which can be any system that utilizes radio or microwave frequency signals to sense objects within the driving environment 101 of the AV 100. The radar(s) 114 can be configured to sense both the spatial locations of the objects (including their spatial dimensions) and velocities of the objects (e.g., using the Doppler shift technology). Hereinafter, "velocity" refers to both how fast the object is moving (the speed of the object) as well as the direction of the object's motion. The sensing system 110 can include a lidar 112, which can be a laser-based unit capable of determining distances to the objects and velocities of the objects in the driving environment 101. Each of the lidar 112 and radar 114 can include a coherent sensor, such as a frequency-modulated continuous-wave (FMCW) lidar or radar sensor. For example, radar 114 can use heterodyne detection for velocity determination. In some implementations, the functionality of a ToF and coherent radar is combined into a radar unit capable of simultaneously determining both the distance to and the radial velocity of the reflecting object. Such a unit can be configured to operate in an incoherent sensing mode (ToF mode) and/or a coherent sensing mode (e.g., a mode that uses heterodyne detection) or both modes at the same time. In some implementations, multiple radars 114 and/or lidars 112 can be mounted on AV 100.

Radar 114 can include one or more radio/microwave sources producing and emitting signals and one or more detectors of the signals reflected back from the objects. In some implementations, radar 114 (or multiple radars 114) can perform a 360-degree scanning in a horizontal direction. In some implementations, radar(s) 114 can be capable of spatial scanning along both the horizontal and vertical directions. In some implementations, the field of view can be up to 90 degrees in the vertical direction (e.g., with at least a part of the region above the horizon being scanned by radar signals). In some implementations, the field of view can be a full sphere (consisting of two hemispheres).

The sensing system 110 can further include one or more cameras 118 to capture images of the driving environment 101. The images can be two-dimensional projections of the driving environment 101 (or parts of the driving environment 101) onto a projecting surface (flat or non-flat) of the camera(s). Some of the cameras 118 of the sensing system 110 can be video cameras configured to capture a continuous (or quasi-continuous) stream of images of the driving environment 101. The sensing system 110 can also include one or more sonars 116, which can be ultrasonic sonars, in some implementations.

The sensing data obtained by the sensing system 110 can be processed by a data processing system 120 of AV 100. For example, the data processing system 120 can include a perception system 130. The perception system 130 can be configured to detect and track objects in the driving environment 101 and to recognize the detected objects. For example, the perception system 130 can analyze images captured by the cameras 118 and can be capable of detecting traffic light signals, road signs, roadway layouts (e.g., boundaries of traffic lanes, topologies of intersections, designations of parking places, and so on), presence of obstacles, and the like. The perception system 130 can further receive radar sensing data (Doppler data and ToF data) to determine distances to various objects in the environment 101 and velocities (radial and, in some implementations, transverse, as described below) of such objects. In some implementations, the perception system 130 can use radar data in combination with the data captured by the camera(s) 118, as described in more detail below.

The perception system 130 can include one or more modules to facilitate association of radar data with camera data, including one or more camera-radar association models (CRAM) 132 that can be used to process data provided by the sensing system 110, including images from camera(s) 118 and a radar return points from radar 114. Input into CRAM 132 can include an image of a portion of the environment depicting one or more objects. Additional input into CRAM 132 can include a radar image (a processed collection of return points) of approximately the same portion of the environment. The radar image can depict an intensity map of the radar signals generated upon reflection from the objects. CRAM 132 can include models that are used to process both types of inputs together to identify correspondence between depictions in the camera image and in the radar image. In some implementations, CRAM 132 can be used to process both images as separate inputs. In some implementations, CRAM 132 can be used to process the images in combination with each other. For example, the radar image can be overlaid over the camera image. In some implementations, CRAM 132 can be used to process a velocity map of the radar returns as an additional input. The velocity map can be a map of the radial (in the direction of detection) velocities of the reflecting objects obtained from a single radar frame. In some implementations, the velocity map can also include lateral velocities of the objects, obtained by tracking the objects between multiple radar frames. Multiple hypothetical pairs of camera/radar images can be input into CRAM 132, which can identify the best (e.g., most probable) association between camera depictions and radar depictions. The best associations can be identified as specific objects (e.g., vehicles, pedestrians, road signs, buildings or other structures) whose state of motion can subsequently be tracked (e.g., location, velocity, angular velocity, and the like). Various models of CRAM 132 can be trained using multiple camera images and multiple radar images, to identify specific camera and radar features in the respective images associated with the same objects.

The perception system 130 can further receive information from a positioning subsystem (not shown in FIG. 1), which can include a GPS transceiver (not shown), configured to obtain information about the position of the AV relative to Earth and its surroundings. The positioning subsystem can use the positioning data, e.g., GPS and IMU data) in conjunction with the sensing data to help accurately determine the location of the AV with respect to fixed objects of the driving environment 101 (e.g. roadways, lane boundaries, intersections, sidewalks, crosswalks, road signs, curbs, surrounding buildings, etc.) whose locations can be provided by map information 135. In some implementations, the data processing system 120 can receive non-electromagnetic data, such as audio data (e.g., ultrasonic sensor data, or data from a mic picking up emergency vehicle sirens), temperature sensor data, humidity sensor data, pressure sensor data, meteorological data (e.g., wind speed and direction, precipitation data), and the like.

The data processing system 120 can further include an environment monitoring and prediction component 126, which can monitor how the driving environment 101 evolves with time, e.g., by keeping track of the locations and velocities of the animated objects (e.g., relative to Earth). In some implementations, the environment monitoring and prediction component 126 can keep track of the changing appearance of the environment due to a motion of the AV relative to the environment. In some implementations, the environment monitoring and prediction component 126 can make predictions about how various animated objects of the driving environment 101 will be positioned within a prediction time horizon. The predictions can be based on the current locations and velocities of the animated objects as well as on the tracked dynamics of the animated objects during a certain (e.g., predetermined) period of time. For example, based on stored data for object 1 indicating accelerated motion of object 1 during the previous 3-second period of time, the environment monitoring and prediction component 126 can conclude that object 1 is resuming its motion from a stop sign or a red traffic light signal. Accordingly, the environment monitoring and prediction component 126 can predict, given the layout of the roadway and presence of other vehicles, where object 1 is likely to be within the next 3 or 5 seconds of motion. As another example, based on stored data for object 2 indicating decelerated motion of object 2 during the previous 2-second period of time, the environment monitoring and prediction component 126 can conclude that object 2 is stopping at a stop sign or at a red traffic light signal. Accordingly, the environment monitoring and prediction component 126 can predict where object 2 is likely to be within the next 1 or 3 seconds. The environment monitoring and prediction component 126 can perform periodic checks of the accuracy of its predictions and modify the predictions based on new data obtained from the sensing system 110. The environment monitoring and prediction component 126 can operate in conjunction with CRAM 134. Although not depicted explicitly in FIG. 1, in some implementations, CRAM 134 can be integrated into the environment monitoring and prediction component 126.

The data generated by the perception system 130, the GPS data processing module 122, and the environment monitoring and prediction component 126 can be used by an autonomous driving system, such as AV control system (AVCS) 140. The AVCS 140 can include one or more algorithms that control how AV is to behave in various driving situations and environments. For example, the AVCS 140 can include a navigation system for determining a global driving route to a destination point. The AVCS 140 can also include a driving path selection system for selecting a particular path through the immediate driving environment, which can include selecting a traffic lane, negotiating a traffic congestion, choosing a place to make a U-turn, selecting a trajectory for a parking maneuver, and so on. The AVCS 140 can also include an obstacle avoidance system for safe avoidance of various obstructions (rocks, stalled vehicles, a jaywalking pedestrian, and so on) within the driving environment of the AV. The obstacle avoidance system can be configured to evaluate the size of the obstacles and the trajectories of the obstacles (if obstacles are animated) and select an optimal driving strategy (e.g., braking, steering, accelerating, etc.) for avoiding the obstacles.

Algorithms and modules of AVCS 140 can generate instructions for various systems and components of the vehicle, such as the powertrain, brakes, and steering 150, vehicle electronics 160, signaling 170, and other systems and components not explicitly shown in FIG. 1. The powertrain, brakes, and steering 150 can include an engine (internal combustion engine, electric engine, and so on), transmission, differentials, axles, wheels, steering mechanism, and other systems. The vehicle electronics 160 can include an on-board computer, engine management, ignition, communication systems, carputers, telematics, in-car entertainment systems, and other systems and components. The signaling 170 can include high and low headlights, stopping lights, turning and backing lights, horns and alarms, inside lighting system, dashboard notification system, passenger notification system, radio and wireless network transmission systems, and so on. Some of the instructions output by the AVCS 140 can be delivered directly to the powertrain, brakes, and steering 150 (or signaling 170) whereas other instructions output by the AVCS 140 are first delivered to the vehicle electronics 160, which generates commands to the powertrain, brakes, and steering 150 and/or signaling 170.

In one example, camera 118, radar 114, or lidar can determine that the path ahead is blocked by a doubly parked truck. The AVCS 140 can cause the AV 100 to nudge to the left closer to the median separating the lane occupied by the AV 100 from the oncoming traffic lane. Radar 114 can acquire data that includes a number of returns from an object located within the oncoming traffic lane. Similarly, camera 118 can acquire an image of the region of the oncoming traffic lane that became visible after the nudging maneuver. The camera image and the radar data can be input into CRAM 134 that can identify with an 85% probability that the object in the oncoming traffic lane is a bus. Based on this identification and using the velocity radar data, the perception system 130 can further determine the velocity of the bus to be 38 mph and the bus to be at 110 yards from the doubly parked truck. The data processing system 120 can, therefore, determine that the bus is to pass the doubly parked car in about 6 seconds, the time that is too short to safely drive around the doubly parked truck. Using the determination made by the data processing system 120, the AVCS 140 can output instructions to powertrain, brakes and steering 150 to stop the AV and wait for the bus to clear the oncoming traffic lane.

Figure 2:
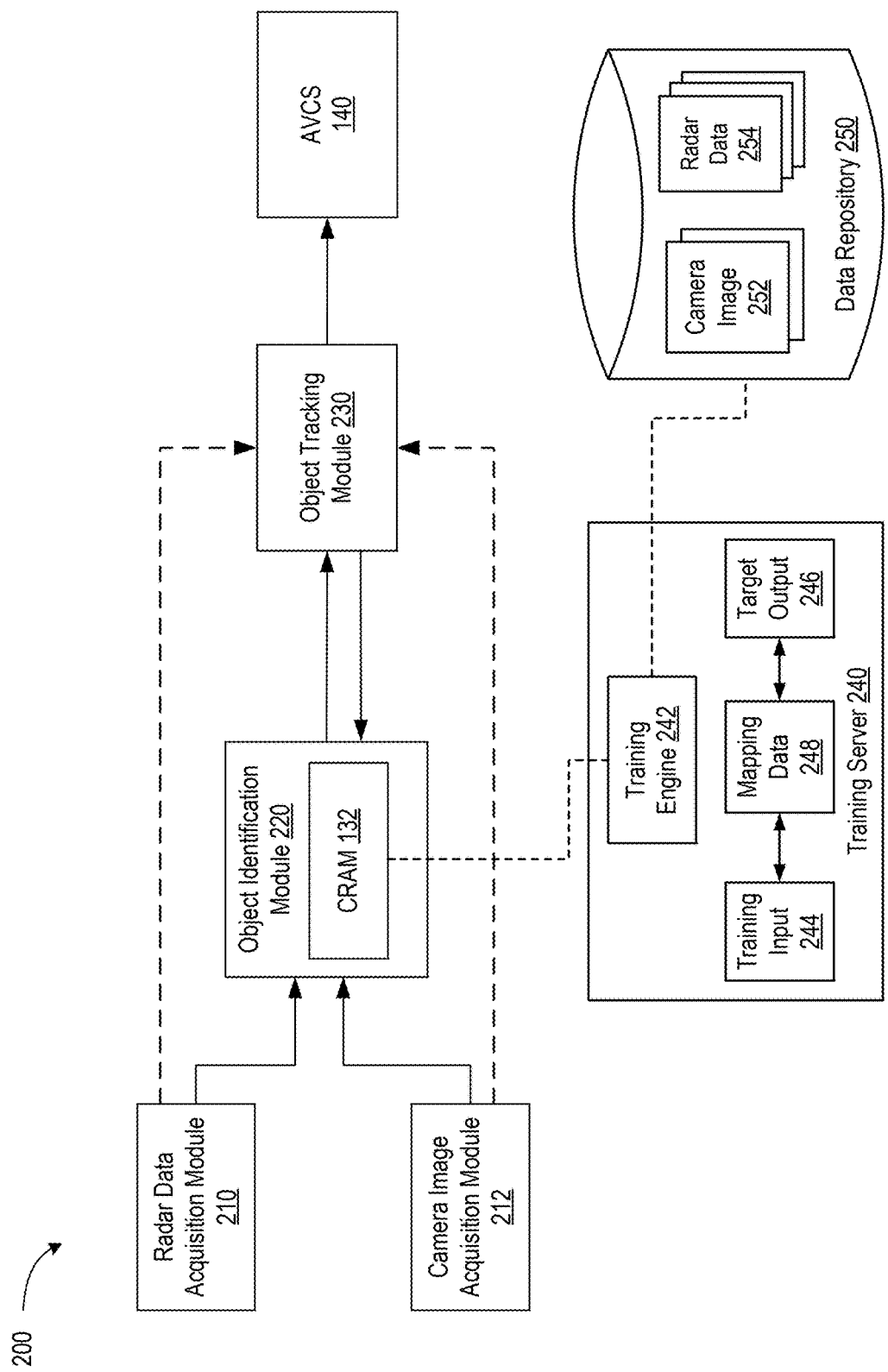
FIG. 2 is a diagram illustrating example architecture of a part of a perception system of an autonomous vehicle that is capable of combining radar data with camera images for fast and reliable object identification and tracking, in accordance with some implementations of the present disclosure.

FIG. 2 is a diagram illustrating example architecture 200 of a part of a perception system of an autonomous vehicle that is capable of combining radar data with camera images for fast and reliable object identification and tracking, in accordance with some implementations of the present disclosure. An input into the perception system (e.g., perception system 130 of FIG. 1) can include data obtained by sensing system 110 (e.g., radar 114 and camera 118), such as distance data, radial velocity data, camera pixel data, etc. For example, a radar data acquisition module 210 can associate each return point with coordinates and radial velocities of the respective reflecting region (e.g., a front bumper of a car, a door of the car, a stop sign, etc.). Various points can correspond to different frames, each frame having a timestamp. A camera image acquisition module 212 can acquire a sequence of images (e.g., similarly identified with timestamps), each image having pixels of various intensities of one color (for black-and-white images) or multiple colors (for color images). An object identification module 220 can process outputs of radar data acquisition module 210 and camera image acquisition module 212. The data provided to the object identification module 220 can correspond to multiple objects in the environment. Even though directions of camera imaging and radar imaging can be known to a certain degree of precision (e.g., from the timestamps in the respective images and a known camera-radar transceiver synchronization data), exact correspondence between pixels of the camera images and return points of the radar point cloud can be lacking. This can happen because visible light (or infrared) waves used in camera(s) 118 and radio waves (or microwaves) propagate, generally, along somewhat different optical paths. Furthermore, spurious reflections of radio waves (e.g., from buildings, vehicles, bridges, road dividers, etc.) can result in ghost returns from completely different directions. Additionally, radar receivers may have a size that is not significantly larger than the wavelength, so that the accuracy of the angle determination of the received signals may be limited.

To facilitate accurate camera-radar associations, object identification module 220 can form multiple hypothetical associations of various patches of camera images with various patches of the radar data (e.g., radar reflected intensity data). For example, object identification module 220 can identify N patches segmented from a camera image and depicting a vehicle, a pedestrian, etc. Furthermore, object identification module 220 can identify M possible regions of radar data (e.g., clusters of lidar return points). Object identification module 220 can then identify N×M possible pairs of camera-radar associations and process each of the identified pairs using CRAM 132. CRAM 132 can output probabilities that the respective associations are true or false. Object identification module 220 can select the pair of the radar image region j with the camera image region k having the highest probability and can further identify (e.g., based on the depictions in the selected camera and/or radar patches) the type of the object (car, truck, overpass, road sign, bus stop, etc.). CRAM 132 can include one or more MLM, such as decision-tree algorithms, support vector machines, deep neural networks, and the like. Deep neural networks can include convolutional neural networks, recurrent neural networks (RNN) with one or more hidden layers, fully connected neural networks, long short-term memory neural networks, Boltzmann machines, and so on.

The perception system can include object tracking module 230, which can receive predicted associations from the object identification module 220. Object tracking module 230 can also receive (as illustrated by the upper dashed arrow) radar data directly from radar data acquisition module 210. For example, once a radar blob (cluster of return points) in radar frame A has been identified by CRAM 132, as corresponding to a motorcycle, object tracking module 230 can monitor subsequent motion of the identified blob using additional radar frames B, C, etc. Tracking can be performed by monitoring coordinates of the blob (e.g., geometric center-of-mass coordinates of the blob, the blob's bounding box, etc.) and velocity (e.g., based on both the radial Doppler-detected velocity and velocity computed from the coordinates).

Object tracking module 230 can further receive (as illustrated by the lower dashed arrow) additional camera data from camera image acquisition module 212. Using the coordinates and velocities determined based on the radar data, object tracking module 230 can verify that the motion of the motorcycle (or any other identified object) inferred from radar data is consistent with the motion of the corresponding object as inferred from the camera images. In some implementations, object tracking module 230 can acquire one of the subsequent radar frames, e.g., frame D with a timestamp TD and segment out a portion of frame D that includes the blob being tracked. Object tracking module 230 can further acquire a camera image with the same timestamp TD (or some other suitable image, e.g., an image with a timestamp that is closest to TD) and segment out a patch of the acquired image with the location that approximately corresponds to the tracked radar blob's bounding box. Object tracking module 230 can then provide the portion of the radar frame and the patch of the camera image to CRAM 132 for verification. CRAM 132 can return the probability that the same object is pictured in the two images. If the returned probability is at or above a first threshold probability $p_1$ (e.g., 85%, 90%, etc.), object tracking module 230 can determine with high confidence that a correct camera-radar association is still being tracked. Object tracking module 230 can continue tracking the object until the object is beyond a predetermined distance of monitoring (which can depend on the speed and/or type of the identified object and be different for a truck than for a pedestrian) while performing periodic verifications with CRAM 132, e.g., every n-th radar frame (and/or camera image). If the probability is below the first threshold probability $p_1$, but at or above the second threshold probability $p_2$ (e.g., 65%, 70%, etc.), object tracking module 230 can determine the status of the tracked object as questionable and place the object for CRAM verification every m-th radar frame (or camera image), where m<n. If it is determined by CRAM 132 that the probability is below the second threshold probability $p_2$, object tracking module 230 can conclude that the association is no longer valid and stop tracking. In such instances, object identification module 220 can repeat the determination from the beginning, as described above, e.g., by identifying multiple camera patches and multiple radar data regions within a suitable but broadened vicinity of the object previously tracked and then determining the most likely pair.

Tracking data generated by object tracking module 230 can be provided to AVCS 140. AVCS 140 evaluates the trajectories of the objects being tracked and determines whether to modify the current driving trajectory of the AV in view of the location and speed of the tracked objects. For example, if a tracked car is within a certain distance from the AV, the AVCS 140 can slow the AV down to a speed that ensures that the car can be safely avoided. Alternatively, AVCS 140 can change lanes, if an adjacent lane is free from obstructions, or perform some other driving maneuver.

CRAM 132 can be trained using actual camera images and radar data that have been annotated with ground truth, which can include correct camera-radar associations, e.g., based on a human input and/or lidar-based identification. Training can be performed by a training engine 242 hosted by a training server 240, which can be an outside server that deploys one or more processing devices, e.g., central processing units (CPUs), graphics processing units (GPUs), etc. In some implementations, one or more models of CRAM 132 can be trained by training engine 242 and subsequently downloaded onto the perception system 130 of the AV 100. CRAM 132, as illustrated in FIG. 2, can be trained using training data that includes training inputs 244 and corresponding target outputs 246 (correct matches for the respective training inputs). During training of CRAM 132, training engine 242 can find patterns in the training data that map each training input 244 to the target output 246.

Training engine 242 can have access to a data repository 250 storing multiple camera images 252 and instances of radar data 254 for actual driving situations in a variety of environments. During training, training engine 242 can select (e.g., randomly) a number of camera images 252 and radar data 254 as training data. Training data can be annotated with correct camera-radar associations. In some implementations, annotations can be made by a developer before the annotated data is placed into data repository 250. Annotated training data retrieved by training server 240 from data repository 250 can include one or more training inputs 244 and one or more target outputs 246. Training data can also include mapping data 248 that maps training inputs 244 to the target outputs 246. In some implementations, mapping data 248 can identify an association of a radar blob with an object in a camera image. The mapping data 248 can include an identifier of the training data, location of the object, size of the object, speed and direction of motion of the object, type of the object, and other suitable information.

During training of CRAM 132, training engine 242 can change parameters (e.g., weights and biases) of various models of CRAM 132 until the models successfully learn how to predict correct camera-radar associations (target outputs 246). In some implementations, different models of CRAM 132 (e.g., camera image model, radar data model, etc., as described below in conjunction with FIG. 5) can be trained separately. In some implementations, various models of CRAM 132 can be trained together (e.g., concurrently). Different models can have different architectures (e.g., different numbers of neuron layers and different topologies of neural connections) and, by virtue of separate training, can have different parameters (weights, biases, activation functions, etc.).

The data repository 250 can be a persistent storage capable of storing images and data as well as data structures configured to identify accurate and fast camera-radar associations, in accordance with implementations of the present disclosure. The data repository 250 can be hosted by one or more storage devices, such as main memory, magnetic or optical storage based disks, tapes or hard drives, NAS, SAN, and so forth. Although depicted as separate from training server 240, in an implementation, the data repository 250 can be a part of training server 240. In some implementations, data repository 250 can be a network-attached file server, while in other implementations, data repository 250 can be some other type of persistent storage such as an object-oriented database, a relational database, and so forth, that can be hosted by a server machine or one or more different machines accessible to the training server 240 via a network (not shown in FIG. 2).

Figure 3A:
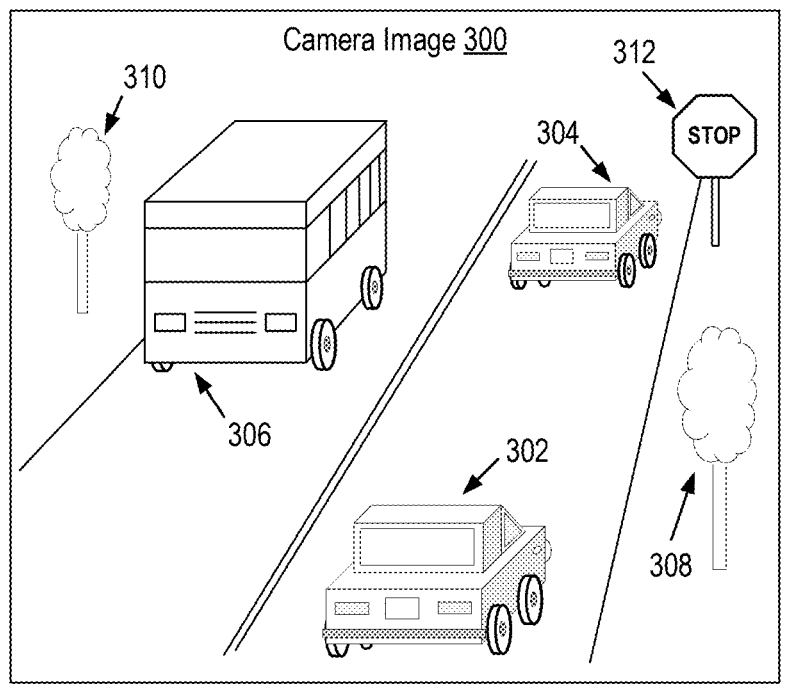
FIG. 3A is a schematic illustration of a camera image obtained by a sensing system of an autonomous vehicle and used for identifying correct camera-radar associations, in accordance with some implementations of the present disclosure.

FIG. 3A is a schematic illustration of a camera image 300 obtained by a sensing system of an autonomous vehicle and used for identifying camera-radar associations, in accordance with some implementations of the present disclosure. Camera image 300 can be an individual image obtained by camera 118 of AV 100, a part of a sequence of images, a single frame of a video obtained by camera 118, and the like. Camera image 300 can depict cars 302 and 304, a bus 306, trees 308 and 310, a stop sign 312, and any other objects (not depicted explicitly in FIG. 3A). One or more objects depicted in FIG. 3A can be moving, e.g., car 302, bus 306, whereas other objects can be non-moving, e.g., trees 308 and 310, stop sign 312, some objects can be stopped temporarily, e.g., car 304, and so on. Camera image 300 can contain accurate information about angular locations of the objects but can be less informative regarding the distance to the objects and the velocity of the objects.

Figure 3B:
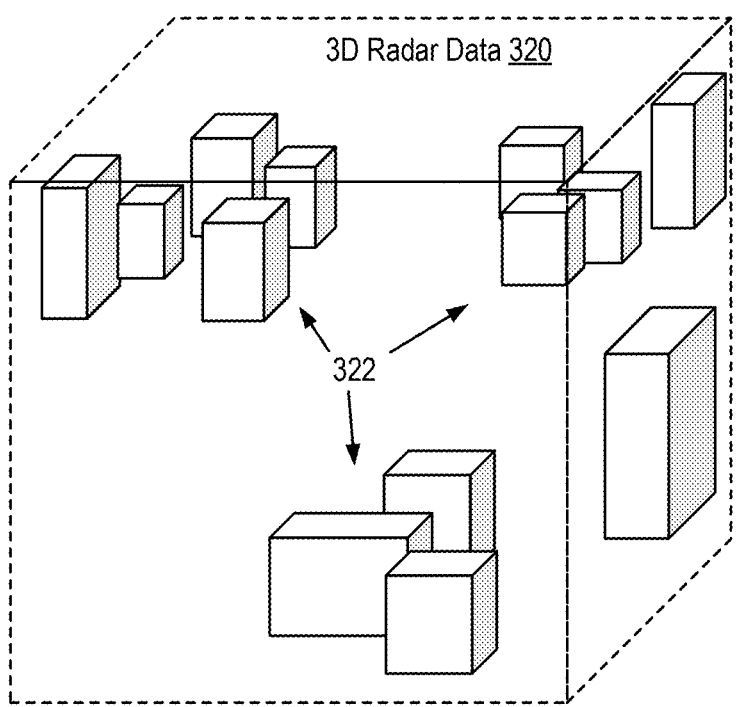
FIG. 3B is a schematic illustration of three-dimensional radar data obtained by a sensing system of an autonomous vehicle and used for identifying camera-radar associations, in accordance with some implementations of the present disclosure.

FIG. 3B is a schematic illustration of three-dimensional radar data 320 obtained by a sensing system of an autonomous vehicle and used for identifying camera-radar associations, in accordance with some implementations of the present disclosure. Radar data 320 can correspond to camera image 300 of FIG. 3A. Depicted schematically are 3D regions 322 of the environment of an AV that generate radar returns. Although regions 322 are depicted (for conciseness) as rectangular bounding boxes, regions of practically any shape can be identified based on the radar data (e.g., by the radar data acquisition module 210 of FIG. 2). Likewise, although the regions 322 are depicted as continuous, actual physical regions (e.g., bodies and surfaces) that generate the radar returns can be discontinuous, continuous but multiply connected, or can have other possible geometry. 3D regions 322 can include to a single object (e.g., a car), a part of an object, or can span multiple objects (e.g., a car and a nearby stop sign). Each region 322 can be characterized by an intensity of radar returns I(x,y,z), which can depend on a suitably chosen set of 3D coordinates x,y,z, such as Cartesian coordinates, cylindrical coordinates, spherical coordinates, or some other set of coordinates. Each region 322 can be further characterized by a radial velocity $V_r(x,y,z)$. The intensity I(x,y,z) and the radial velocity $V_r(x,y,z)$ can be defined for a discrete set of coordinates, a quasi-continuous set of coordinates, or for a continuous range of coordinates (e.g., interpolated from a discrete or quasi-continuous set of radar return points).

Figure 4A:
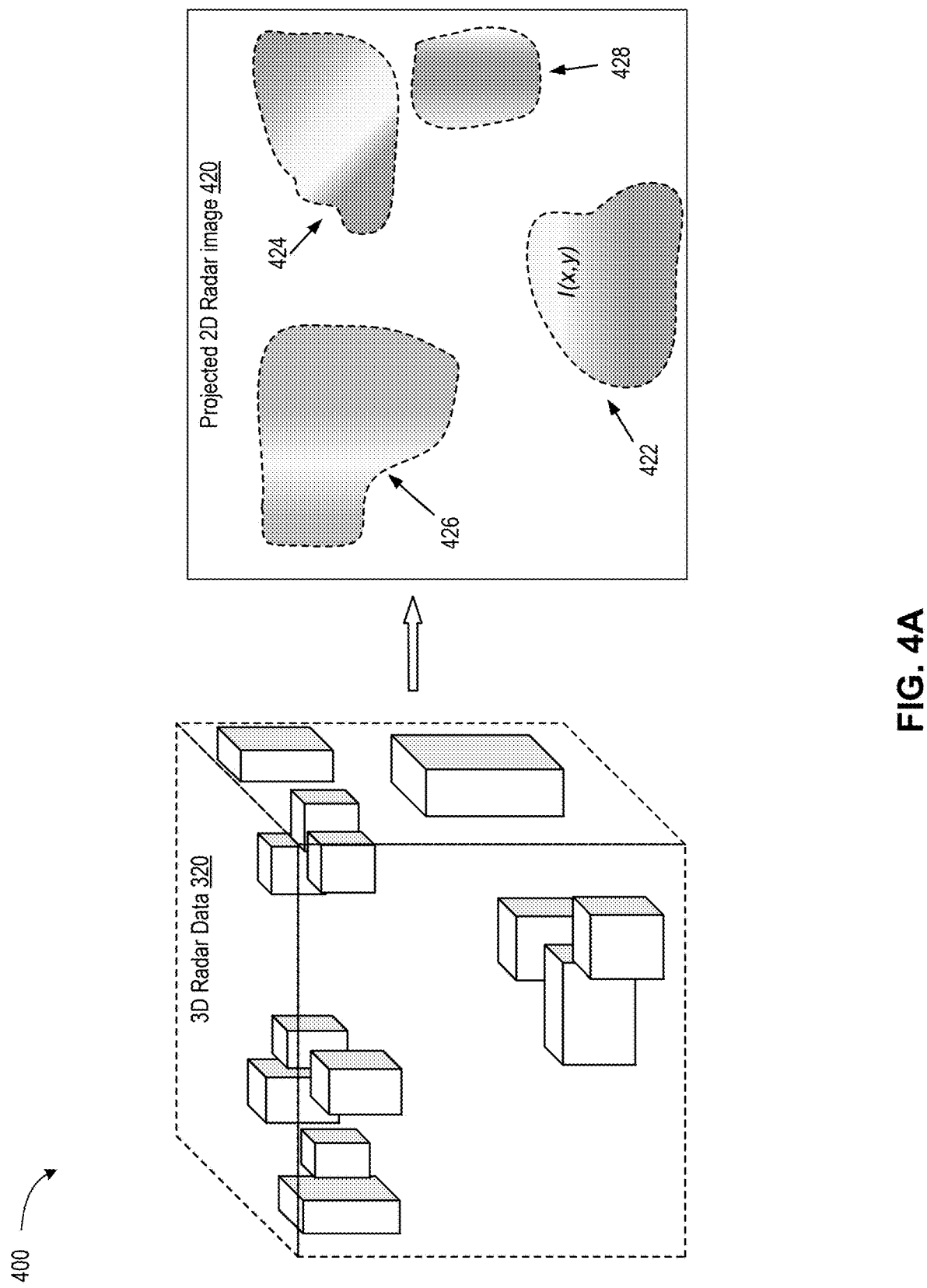
FIG. 4A is a schematic depiction of a projection of three-dimensional radar data onto a two-dimensional surface to obtain projected two-dimensional radar image used for identifying camera-radar associations, in accordance with some implementations of the present disclosure.

FIG. 4A is a schematic depiction of a projection 400 of three-dimensional radar data 320 onto a two-dimensional surface to obtain projected two-dimensional radar image 420 used for identifying camera-radar associations, in accordance with some implementations of the present disclosure. Projection 400 can be on a plane of the camera image 300 (or any other imaging surface of the camera). 3D regions 322 projected on the surface of the camera can have a form of blobs. Some of the blobs can be limited to a single object, e.g., blob 422 can correspond to a car 302 in FIG. 3A and blob 428 can correspond to tree 308. Some of the blobs can span multiple objects. For example, blob 424 can correspond to closely situated car 304 and stop sign 312 and blob 426 can correspond to bus 306 and tree 310. Projection 400 can include a projected radar intensity $I(x,y,z) \rightarrow I(x,y)$ and radial velocity $V_r(x,y,z) \rightarrow V_r(x,y)$. In some implementations, one or more models of CRAM 132 can be trained to process camera image 300 and projected 2D radar image 420. In some implementations, one or more models of CRAM 132 can additionally (or instead) process a combined image that includes both the camera image and the projected 2D radar image 420.

Figure 4B:
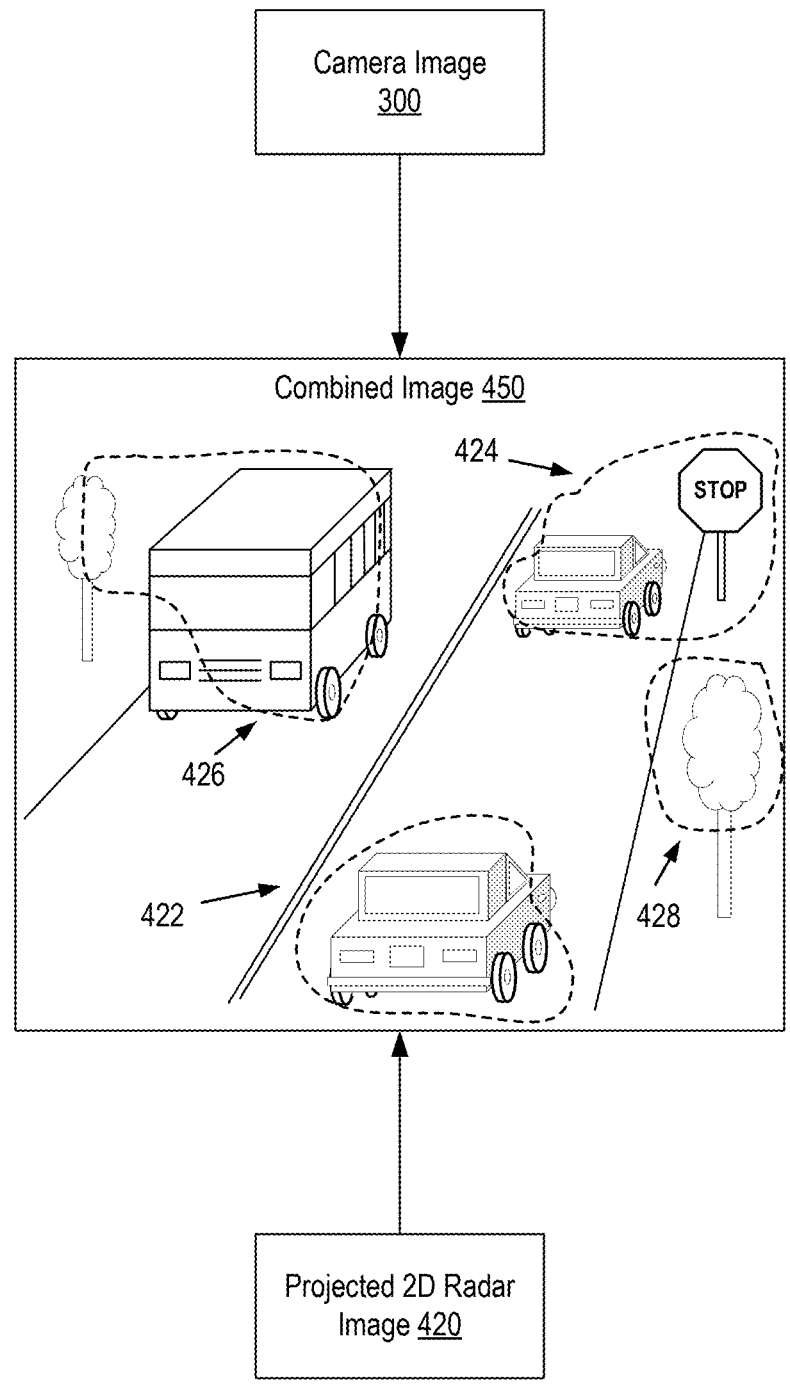
FIG. 4B is a schematic depiction of a combined image obtained by combining camera image with projected two-dimensional radar image, in accordance with some implementations of the present disclosure.

FIG. 4B is a schematic depiction of a combined image 450 obtained by combining camera image 300 with projected 2D radar image 420, in accordance with some implementations of the present disclosure. Combined image can be obtained by overlaying the projected 2D radar image 420 over camera image 300. In some implementations, overlaying is implemented by adding (weighted) intensity of the radar data $I_1(x,y)$ to the intensity of the camera image $I_2(x,y)$ to obtain the total intensity $w \cdot I_1(x,y) + I_2(x,y)$, where weight w can be selected based on empirical testing. In some implementations, the overlay can be implemented as a two-component intensity vector $\{I_1(x,y), I_2(x,y)\}$. In some implementations, where the camera image is a color image, the vector can be a four-component vector $\{I_1(x,y), I_R(x,y), I_G(x,y), I_B(x,y)\}$, with the intensity of the respective color (Red, Green, and Blue) denoted by a corresponding subscript. In some implementations, the intensity vector can include additional components, e.g., infrared intensity components, provided by the same camera or a separate cameras of the AV.

Figure 5:
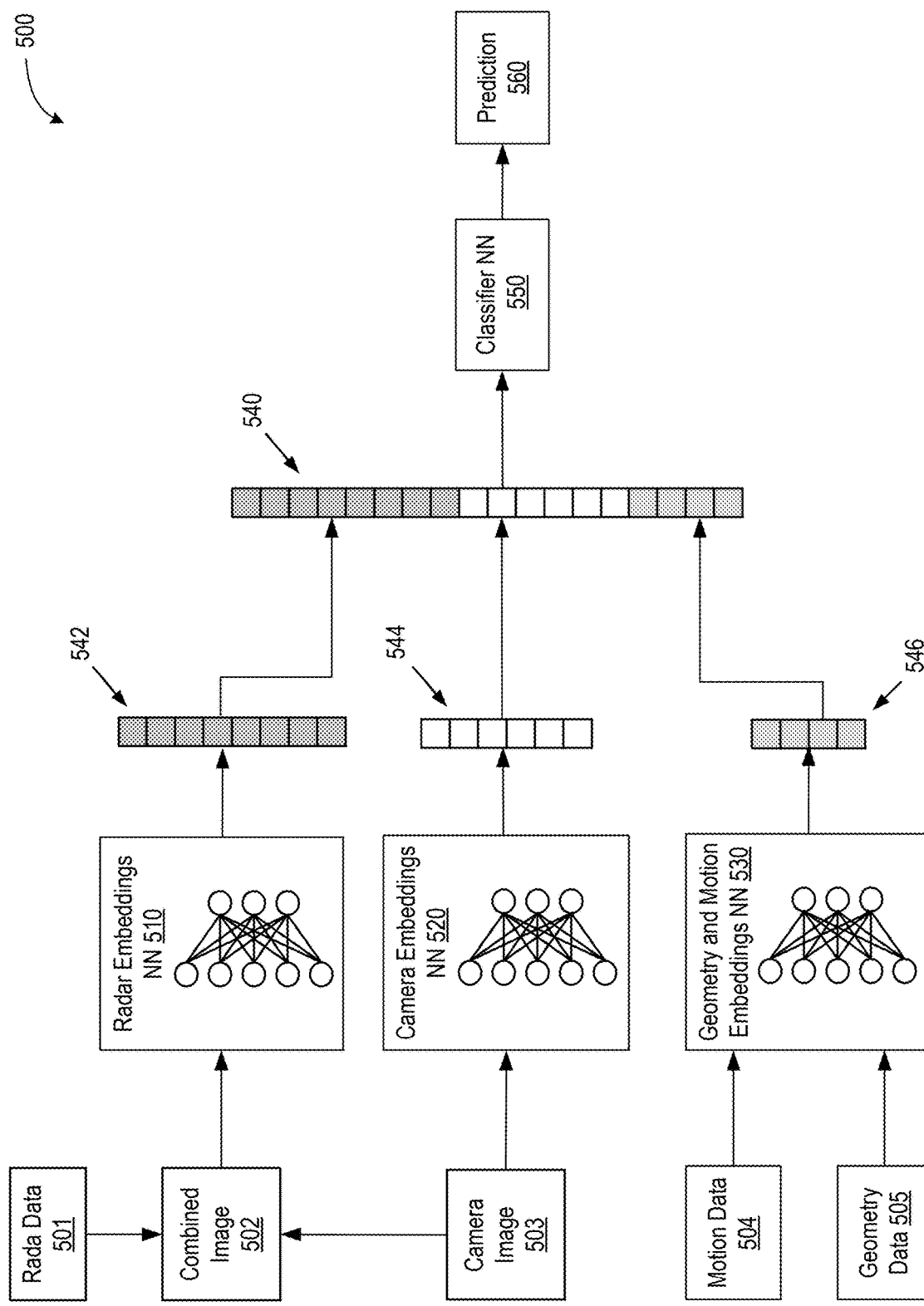
FIG. 5 is a schematic diagram illustrating an example camera-radar association module that uses one or more machine learning models for fast and reliable object identification and tracking, in accordance with some implementations of the present disclosure.

FIG. 5 is a schematic diagram illustrating an example camera-radar association module (CRAM) 500 that uses one or more machine learning models for fast and reliable object identification and tracking, in accordance with some implementations of the present disclosure. CRAM 500 can be CRAM 132 of the perception system 130 depicted in FIG. 1. CRAM 500 can include multiple neural networks (NNs), including radar embeddings NN 510, camera embeddings NN 520, geometry and motion embeddings NN 530, and/or other networks not explicitly depicted in FIG. 5. Neurons in the neural networks are associated with learnable weights and biases. The neurons can be arranged in layers. Some of the layers can be hidden layers. Each of the NNs 510, 520, and 530 can include multiple neuron layers and can be configured to perform one or more functions that facilitate obtaining correct camera-radar associations. Some of the NNs 510, 520, and 530 can be optional.

The input into CRAM 500 can include a radar data 501 and a camera image 503. Camera image 503 can be in any suitable digital format (JPEG, TIFF, GIG, BMP, CGM, SVG, and so on). Camera image 503 can be a whole image obtained by a camera of an AV or a patch of the whole image that (prospectively) includes a candidate object being identified, e.g., a vehicle, a road sign, a building, a structure, a pedestrian, or any other object. Similarly, the radar data 501 can include a portion of a radar frame that is hypothesized to correspond to the image patch. In some implementations, the input radar data 501 can be represented as a two-dimensional projection of the three-dimensional radar intensity, as described in more detail in connection with FIG. 4A. In some implementations, the input into the radar embedding NN 510 can be a combined image 502 that has the radar data 501 overlaid (superimposed) on the camera image 503, as described in more detail in connection with FIG. 4B. Input into the geometry and motion embeddings NN 530 can include motion data 504 that can include velocity data and coordinate data. In some implementations, the velocity data can include the radial velocity data obtained from radar Doppler data of a single frame, e.g., using a two-dimensional projection, $V_r(x,y,z) \rightarrow V_r(x,y)$. In some implementations, the velocity data can include transverse velocity $V_\perp(x,y)$ that can be obtained from multiple radar frames, e.g., by tracking the motion of a respective radar blob in the lateral direction with the passage of time. In some implementations, the lateral velocity data can be obtained from a series of two or more consecutive camera images. Input into geometry and motion embeddings NN 530 can further include geometry data 505, such as the coordinate data, e.g., coordinates of the radar blob including but not limited to the coordinates of the bounding box of the radar blob (e.g., corners of the bounding box), a coordinate of a center (e.g., center of mass) of the radar blob, a shape of the surface of the radar blob (e.g., eccentricity, aspect ratio, etc.), and so on. Radar data 501, camera image 503, motion data 504, and geometry data can be obtained and processed in real time.

Camera image 503 can include a number of pixels. The number of pixels can depend on the resolution of the image, e.g., an image can be represented by 2048×1024 pixels or any other suitable number of pixels. Each pixel can be characterized by one or more intensity values. A black-and-white pixel can be characterized by one intensity value representing the brightness of the pixel, with value 1 corresponding to a white pixel and value 0 corresponding to a black pixel. The intensity value can assume continuous (or discretized) values between 0 and 1 (or between any other chosen limits, e.g., 0 and 255). Similarly, a color pixel can be represented by more than one intensity value, e.g., by three intensity values (e.g., if the RGB color encoding scheme is used) or four intensity values (e.g., if the CMYK color encoding scheme is used). Camera image 503 can be preprocessed prior to being input into camera embeddings NN 520. For example, camera image 503 can be downscaled (with multiple pixel intensity values combined into a single pixel), upsampled, filtered, denoised, and the like.

The radar embeddings NN 510 processes combined image 502 and outputs a radar embedding 542. Similarly, the camera embeddings NN 520 processes camera image 503 and outputs a camera embedding 544. The geometry and motion embeddings NN 530 processes motion data 504 and outputs a geometry and motion embedding 546. Each of the NNs 510, 520, and 530 can include multiple hidden neuron layers. Processing of input images and data by NNs 510, 520, and 530 will next be illustrated for radar embeddings NN 510, but it should be understood that similar techniques can be used in relation to camera embeddings NN 520 and/or geometry and motion embeddings NN 530.

In some implementations, radar embeddings NN 510 can include a number of convolutional layers to extract local and global context of combined image 502. Convolutional layers can use any suitable parameters, including kernel/mask size, kernel/mask weights, sliding step size, and the like. Convolutional layers can alternate with padding layers and can be followed with one or more pooling layers, e.g., maximum pooling layers, average pooling layers, and the like. Some of the layers of radar embeddings NN 510 can be fully-connected layers. In some implementations, radar embeddings NN 510 can be fully convolutional. The number of nodes in the output layer of radar embeddings NN 510 can be equal to the number of elements of the radar embedding 542. The radar embedding 542 can be a vector of values that represents the content of combined image 502. The elements of radar embedding 542 can be an output of nodal operations involving learned weights and biases determined during training.

Training of radar embeddings NN 510 can be performed using a Siamese network. A Siamese network can be a twin network having the same parameters (weights, biases, and activation functions) as radar embeddings NN 510. Different images can be input into radar embeddings NN 510 and its Siamese twin network. The embeddings output by radar embeddings NN 510 and the Siamese twin network be can be processed by a classifier network that outputs a binary value, e.g., 1 or 0, indicating whether the input images depict objects of the same type or different types. In some implementations, a type of an object can refer to a high-level classification, such as a car, a semi-truck, a bus, a motorcycle, a pedestrian, a structure, and so on. In some implementations, a type of an object can refer to a medium-level classification, such as a sedan car, an SUV, a sports car, and so on. In some implementations, a type of an object can refer to a low-level classification, that distinguishes different makes of cars, buses, trucks, and the like. A kind of radar embeddings NN 510 to be selected (and trained) for specific uses can be based on the target type of the objects that are intended to be identified (and tracked). For example, radar embeddings NN 510 that is intended to be trained for high-level identification of objects can have fewer number of nodes, hidden layers, etc, than a similar network that is intended to be used for identifying low-level distinctions of objects (and vice versa).

During training, incorrect classification of different objects as the same or the same objects (or objects of the same type) as different can be used to adjust weights and biases of radar embeddings NN 510 by backpropagating errors (incorrect classifications) through the neuron layers of radar embeddings NN 510. More specifically, weights and biases of radar embeddings NN 510 are modified until a given pair of training images is successfully recognized. Another pair of images can then be selected and used to further train radar embeddings NN 510. The training process can continue until a target success rate (e.g., 90%, 95%, etc.) of reliable classification of objects depicted in training images is reached. In some implementations, the target success rate can be determined based on a set of testing images previously not seen by radar embeddings NN 510. Similar Siamese training can be used for training of other NNs, such as camera embeddings NN 520, geometry and motion embeddings NN 530, and/or other NNs that can be deployed as part of CRAM 500.

The output of NNs 510-530, e.g., radar embedding 510, camera embedding 520, and geometry and motion embedding 546, can be joined (e.g., concatenated) into a combined embedding 540. The combined embedding 540 can be input into a classifier NN 550 trained to output a prediction 560 of the likelihood that the radar data 501 and camera image 503 depict the same object. For example, prediction 560 can be or include a probability, e.g., 20%, 75%, 96%, etc., that the same object is captured by the radar and the camera. Classifier NN 550 can be a fully-connected neural network, in some implementations. In some implementations, classifier NN 550 can include one or more convolutional layers. Classifier NN 550 can be trained separately from NNs 510-530, e.g., after NNs 510-530 have been successfully trained, as described above. In some implementations, classifier NN 550 can be trained concurrently with NNs 510-530. In such implementations, Siamese training of NNs 510-530 may not be performed and incorrect predictions 560 can be backpropagated through neuron layers of all NNs 510-530.

Prediction 560 can be obtained for multiple pairs of radar data 501 and camera images 503. With reference to FIG. 2, the obtained predictions 560 can be processed by object identification module 220, which can select the prediction with the highest probability of association and provide the selected prediction to object tracking module 230 for tracking as described above in connection with FIG. 2. In some implementations, if multiple predictions have probabilities close to the identified maximum probability, e.g., 88%, 84%, 79%, etc. (or within a certain range, e.g., 10%, 15%, etc., from the maximum probability), or if multiple predictions have the probabilities above a certain set threshold (e.g., 85%), object identification module 220 can select all such multiple predictions as temporary hypotheses. Object tracking module 230 can then track the multiple selected predictions as hypotheses for subsequent verification. Each of the tracked hypotheses can be verified by acquiring (using radar data acquisition module 210 and camera image acquisition module 212) new radar data and new camera image for each of the hypothesized camera-radar associations and processing new data through CRAM 500. It can be expected that, with time, false associations will become less likely whereas true associations will have probabilities that remain high (or even increase with time). For example, if two radar blobs in the radar image acquired at time $t_1$ are caused by a pedestrian (blob A) walking past a stop sign (blob B) and camera image are similarly cropped into patch a (pedestrian) and patch b (stop sign), CRAM 500 can initially identify four high probability associations (A↔a;A↔b;B↔a;B↔b). Object tracking module 230 can then treat all four associations as temporary hypotheses to be tracked. Additional data acquired at a later time $t_2$ and input into CRAM 500 can indicate the pedestrian and the stop sign being separated by a larger (than at time $t_1$) distance. CRAM 500 can now determine that some associations (e.g., A↔a;B↔b) still have a high probability (e.g., above a threshold probability or at approximately the same level as at time $t_1$) of being correct whereas other associations (e.g., A↔b;B↔a) have probabilities that are lower than before. Object identification module 220 (or object tracking module 230) can discard the associations whose probabilities have decreased and continue tracking the remaining associations (e.g., A↔a;B↔b).

Multiple variations of the architecture of CRAM can be implemented that differ from CRAM 500 in one or more aspects. In some implementations, motion data 504 is not input into CRAM and no geometry and motion embedding NN 530 is used. In such implementations, combined embedding 540 can include radar embedding 542 and camera embedding 544. In some implementations, both camera embeddings NN 520 and geometry and motion embeddings NN 530 can be absent and CRAM processed only combined image 502 using radar embeddings NN 510. For example, the combined image 502 can have the underlying camera image 503 and the radar data 501 overlay represented as separate intensities, e.g., $I_1(x,y)$, $I_2(x,y)$, etc. The intensities can be processed with filters of one or more initial convolutional layers separately before filters of one or more subsequent convolutional layers begin mixing of separate intensities until the radar embedding 542 is eventually produced, which includes a context of the entire combined image 502. In some implementations, radar data 501 is input into radar embeddings NN 510 directly, without being combined with the camera image 503. In such implementations, radar data 501 and camera image 503 are processed separately until classifier NN 550 receives the combined embedding 540. In some implementations, all NNs being used can be trained together by backpropagating a mismatch between training predictions and target predictions through neuron layers of all NNs of the CRAM.

FIGS. 6A, 6B, 7A, and 7B illustrate example methods 600 and 700 and their possible variations of combining radar data with camera images for fast and reliable object identification and tracking. A processing device, having one or more processing units (CPUs) and memory devices communicatively coupled to the CPU(s), can perform methods 600 and 700 and/or each of their individual functions, routines, subroutines, or operations. The processing device executing methods 600 and 700 can perform instructions issued by various components of the perception system 130 of FIG. 1, e.g., CRAM 132. Methods 600 and 700 can be directed to systems and components of an autonomous driving vehicle, such as the autonomous vehicle 100 of FIG. 1. Methods 600 and 700 can be used to improve performance of the autonomous vehicle data processing system 120 and/or the autonomous vehicle control system 140. In certain implementations, a single processing thread can perform methods 600 and 700. Alternatively, two or more processing threads can perform methods 600 and 700, each thread executing one or more individual functions, routines, subroutines, or operations of the methods. In an illustrative example, the processing threads implementing methods 600 and 700 can be synchronized (e.g., using semaphores, critical sections, and/or other thread synchronization mechanisms). Alternatively, the processing threads implementing methods 600 and 700 can be executed asynchronously with respect to each other. Various operations of methods 600 and 700 can be performed in a different order compared with the order shown in FIGS. 6A, 6B, 7A, and 7B. Some operations of methods 600 and 700 can be performed concurrently with other operations. Some operations can be optional.

Figure 6A:
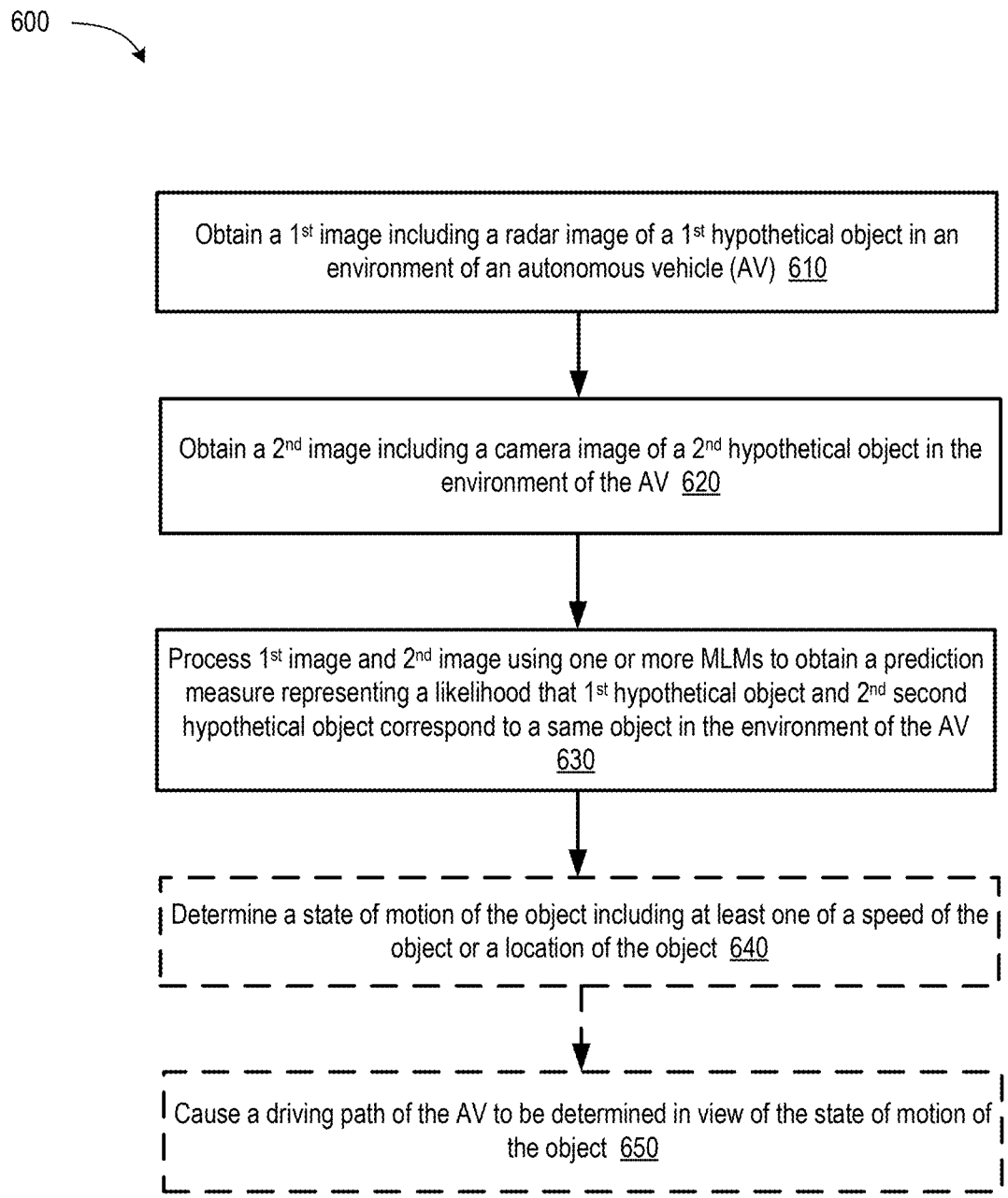
FIG. 6A illustrates an example method of forming reliable camera-radar associations in autonomous vehicle applications, in accordance with some implementations of the present disclosure.

FIG. 6A illustrates an example method 600 of forming reliable camera-radar associations in autonomous vehicle applications, in accordance with some implementations of the present disclosure. At block 610, method 600 can include obtaining, e.g., by a processing device of the data processing system of an AV, a first image that can include a radar image of a first hypothetical object in an environment of the AV. In some implementations, the radar image can include a three-dimensional representation of the radar data (e.g., intensity $I(x,y,z)$). In some implementations, the radar image can include a two-dimensional projection (e.g., $I(x,y)$) of a three-dimensional radar data obtained for a region of the environment of the AV that includes the first hypothetical object. The first hypothetical object can be any animate or inanimate object in the environment (e.g., a vehicle, a structure, a pedestrian, a bicyclist, a traffic light, a road sign, etc.). In some implementations, the radar image can include additional elements. For example, the radar image can include an overlay of the two-dimensional projection of the three-dimensional radar data onto an image of the environment of the AV taken with a photographic or video camera (referred to herein as a camera image).

At block 620, method 600 can continue with the processing device obtaining a second image. The second image can include a camera image of a second hypothetical object in the environment of the AV. The second hypothetical object can be any object in the environment depicted in the second image, which can be the same object as the first hypothetical object or a different object. The second image can be taken of a portion of the environment that includes the first hypothetical object or is proximate to the first hypothetical object but need not be identical to the portion of the environment captured by the radar image.

At block 630, method 600 can continue with processing the first image and the second image using one or more machine-learning models (MLMs) to obtain a prediction measure. The prediction measure can represent a likelihood that the first hypothetical object and the second hypothetical object correspond to the same object in the environment of the AV. In some implementations, the prediction measure can be a probability that the first and second hypothetical objects are the same. In some implementations, the prediction measure can be a binary value (e.g., 0 or 1, YES or NO, etc.).

At block 640, the obtained prediction measure can be used to determine a state of motion of the object. For example, the prediction measure can indicate that the first hypothetical object and the second hypothetical object correspond to the same object. From the camera image, the object can be identified (e.g., using methods of image recognition) as a passenger car having specific attributes (e.g., make, model, color, size, etc.). From the radar image, the state of motion of the object can be determined. The state of motion can include a speed of the object, a location of the object, or both.

At block 650, the processing device performing method 600 can cause a driving path of the AV to be determined in view of the state of motion of the object. For example, the perception system of the AV can determine that the object is sufficiently close to the AV (and/or is moving with a substantial speed) to interfere with the driving path of the AV. The perception system can communicate this information to the control system (e.g., the AVCS 140). The control system can chart a new driving path (or modify the existing driving path) so to avoid the object. The control system can implement the new driving path by outputting instructions to powertrain and steering 150, vehicle electronics 160, signaling 170, etc., to cause the AV to brake, change lanes, stop, back up, accelerate, and so on, and to ensure that the AV follows the determined driving path.

Figure 6B:
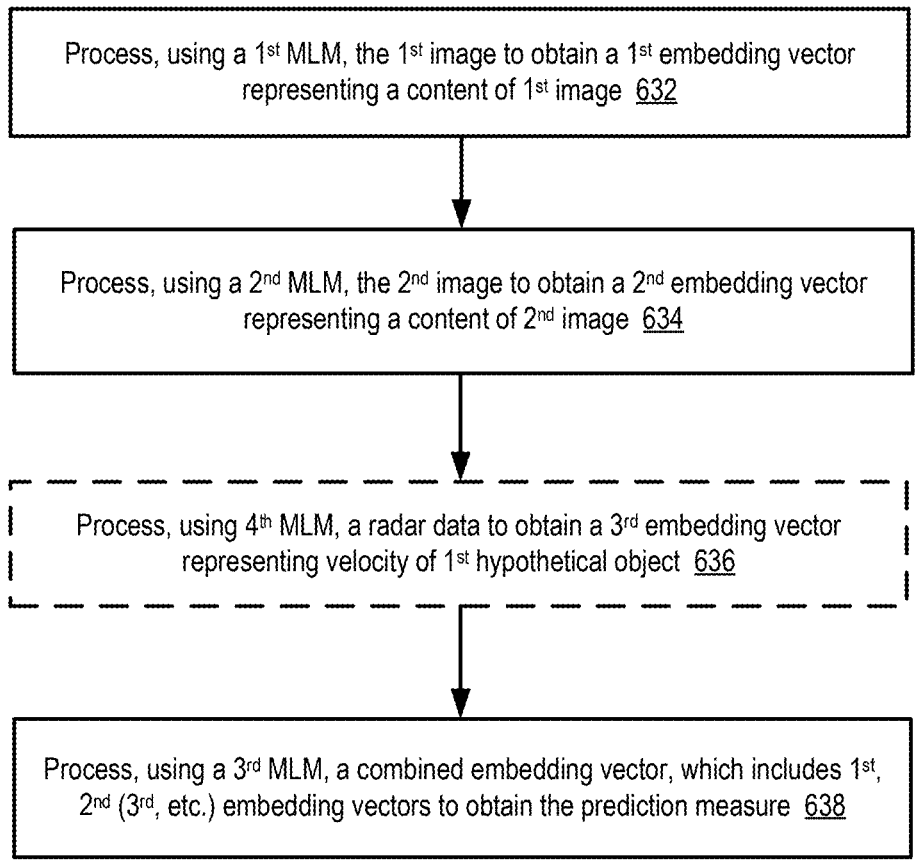
FIG. 6B illustrates example operations of processing radar data and camera image during formation of reliable camera-radar associations, in accordance with some implementations of the present disclosure.

FIG. 6B illustrates example operations of processing radar data and camera image during formation of reliable camera-radar associations, in accordance with some implementations of the present disclosure. Operations depicted in FIG. 6B can be performed as part of block 630 of method 600 illustrated in FIG. 6A. More specifically, at block 632, data processing system of AV (e.g., CRAM 132), can use a first MLM (e.g., radar embeddings NN 510 of FIG. 5) to process the first image to obtain a first embedding vector representing a content of the first image. At block 634, the data processing system can use a second MLM (e.g., camera embeddings NN 520 of FIG. 5) to process the second image to obtain a second embedding vector representing a content of the second image. The first embedding vector and/or a third embedding vector can subsequently be used as an input into a third MLM (e.g., classifier NN 550).

At optional (as depicted by the dashed box) block 636, a fourth MLM (e.g., geometry and motion embeddings NN 530 of FIG. 5) can be used to process the radar data and obtain a third embedding vector representing velocity of the first hypothetical object. For example, the input into the fourth MLM can include velocity (e.g., radial velocity $I(x,y)$) derived from the radar data, e.g., single-frame radar data or multi-frame radar data. More specifically, wherein the radar data can be obtained from two or more radar images of the environment of the AV, each of the images taken at different times and, therefore, capturing temporal changes in the environment. In some implementations, a location (e.g., a bounding box) of the first hypothetical object can be processed by the fourth MLM so that the third embedding vector also represents the location of the object (in addition to the velocity of the object). The third embedding vector can be included into the combined embedding vector (e.g., combined embedding 540), which can also include (e.g., by concatenation) the first embedding vector and the second embedding vector.

At block 638, the processing system of the AV can input the combined embedding vector into the third MLM, to obtain the prediction measure (e.g., prediction 560). In some implementations, all or at least some of the first MLM, the second MLM, and the fourth MLM can include one or more convolutional neural layers. In some implementations, the third MLM can include one or more fully-connected neuron layers. In some implementations, all or at least some of the first MLM, the second MLM, and the fourth MLM are trained using a Siamese neural network, e.g., a neural network that is identical to the neural network being trained.

Figure 7A:
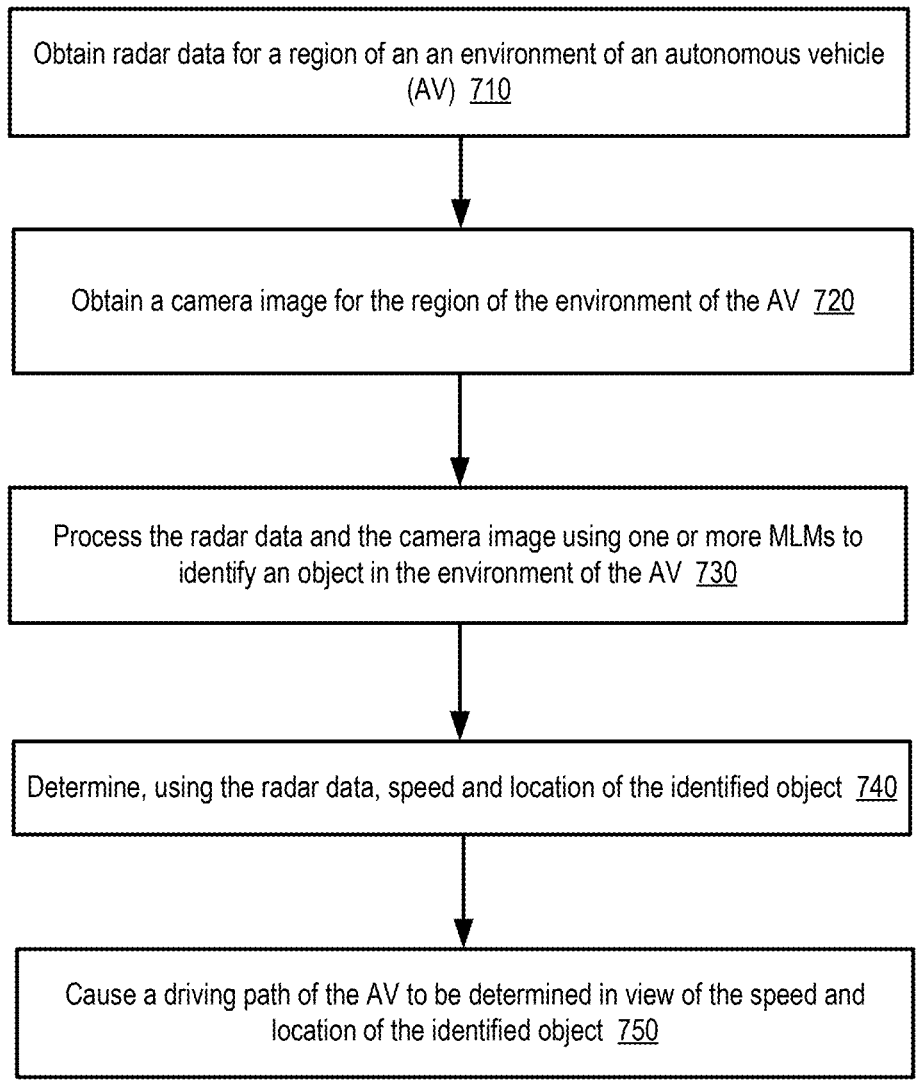
FIG. 7A illustrates another example method of forming reliable camera-radar associations in autonomous vehicle applications, in accordance with some implementations of the present disclosure.

FIG. 7A illustrates another example method 700 of forming reliable camera-radar associations in autonomous vehicle applications, in accordance with some implementations of the present disclosure. At block 710, method 700 can include obtaining, by a processing device (e.g., one or more CPU of the data processing system 120), radar data for a region of an environment of an AV. At block 720, method 700 can continue with the processing device obtaining a camera image for the region of the environment of the AV. The radar data and the camera image do not need to cover the entire region and each can cover a different portion of the region, with the portions having some overlap or (in some instances) having little or no overlap.

At block 730, method 700 can continue with the processing device processing the radar data and the camera image using one or more MLMs to identify an object in the environment of the AV. At block 740, method 700 can continue with determining, using the radar data, speed and location of the identified object, and at block 750 the method can include causing a driving path of the AV to be determined in view of the speed and location of the identified object.

Figure 7B:
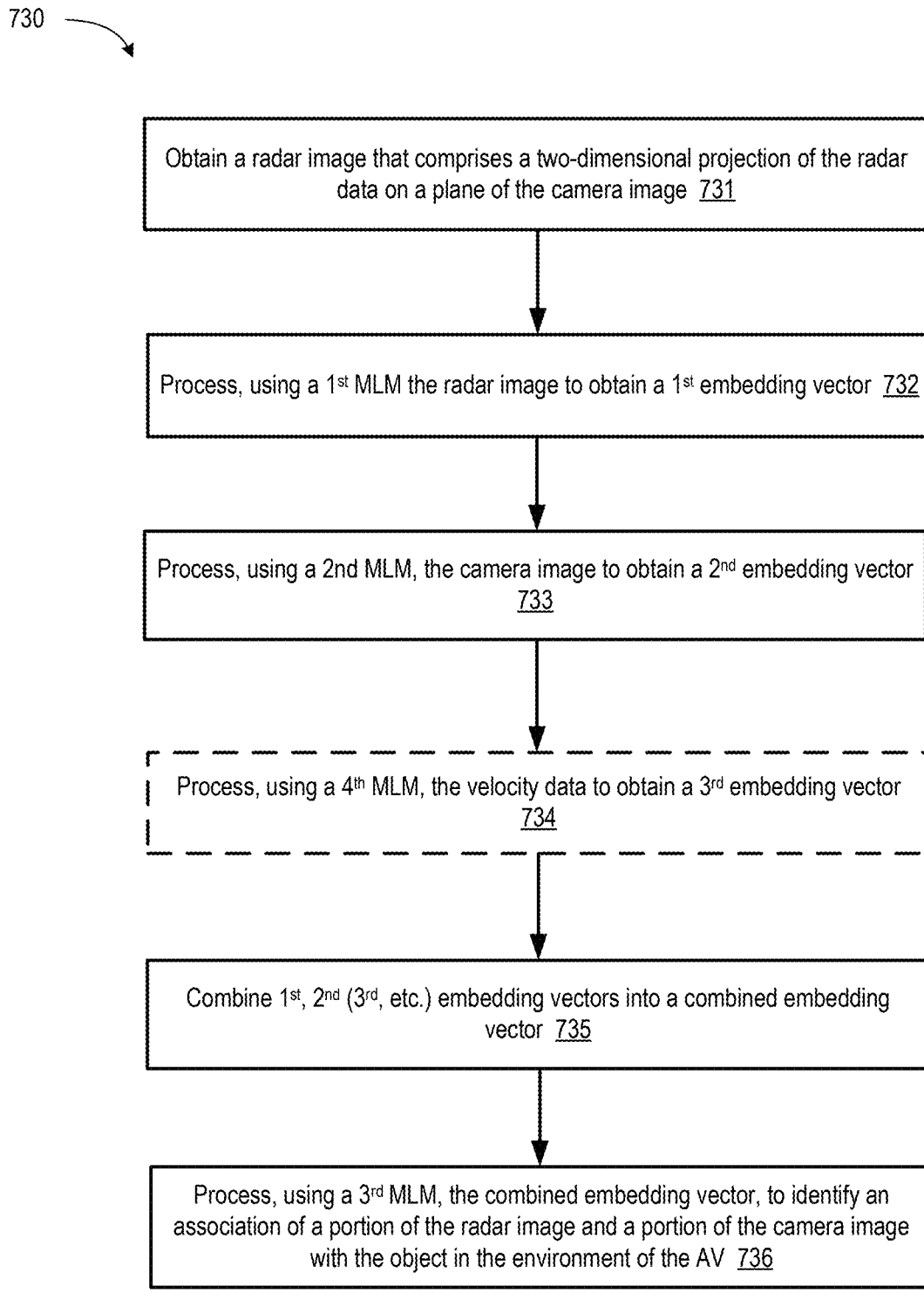
FIG. 7B illustrates further example operations of processing radar data and camera image during formation of reliable camera-radar associations, in accordance with some implementations of the present disclosure.

FIG. 7B illustrates further example operations of processing radar data and camera image during formation of reliable camera-radar associations, in accordance with some implementations of the present disclosure. Operations depicted in FIG. 7B can be performed as part of block 730 of method 700 illustrated in FIG. 7A. More specifically, at block 731, the data processing system of the AV can obtain a radar image that includes a two-dimensional projection of the radar data on a plane of the camera image. At block 732, the data processing system can process, using a first MLM, the radar image to obtain a first embedding vector and at block 733 can process, using a second MLM, the camera image to obtain a second embedding vector. At block 734, the data processing system can process, using a fourth MLM, the radar data to obtain a third embedding vector. The radar data can include the velocity data for one or more objects in the environment of the AV. At block 735, the data processing system can combine the first embedding vector, the second embedding vector, and the third embedding vector into a combined embedding vector, and can process, at block 736, the combined embedding vector using a third MLM. The processing by the third MLM can identify an association of a portion of the radar image (e.g., intensity blob corresponding to a vehicle) and a portion of the camera image (e.g., a picture of the vehicle) with the object (the vehicle) in the environment of the AV.

Figure 8:
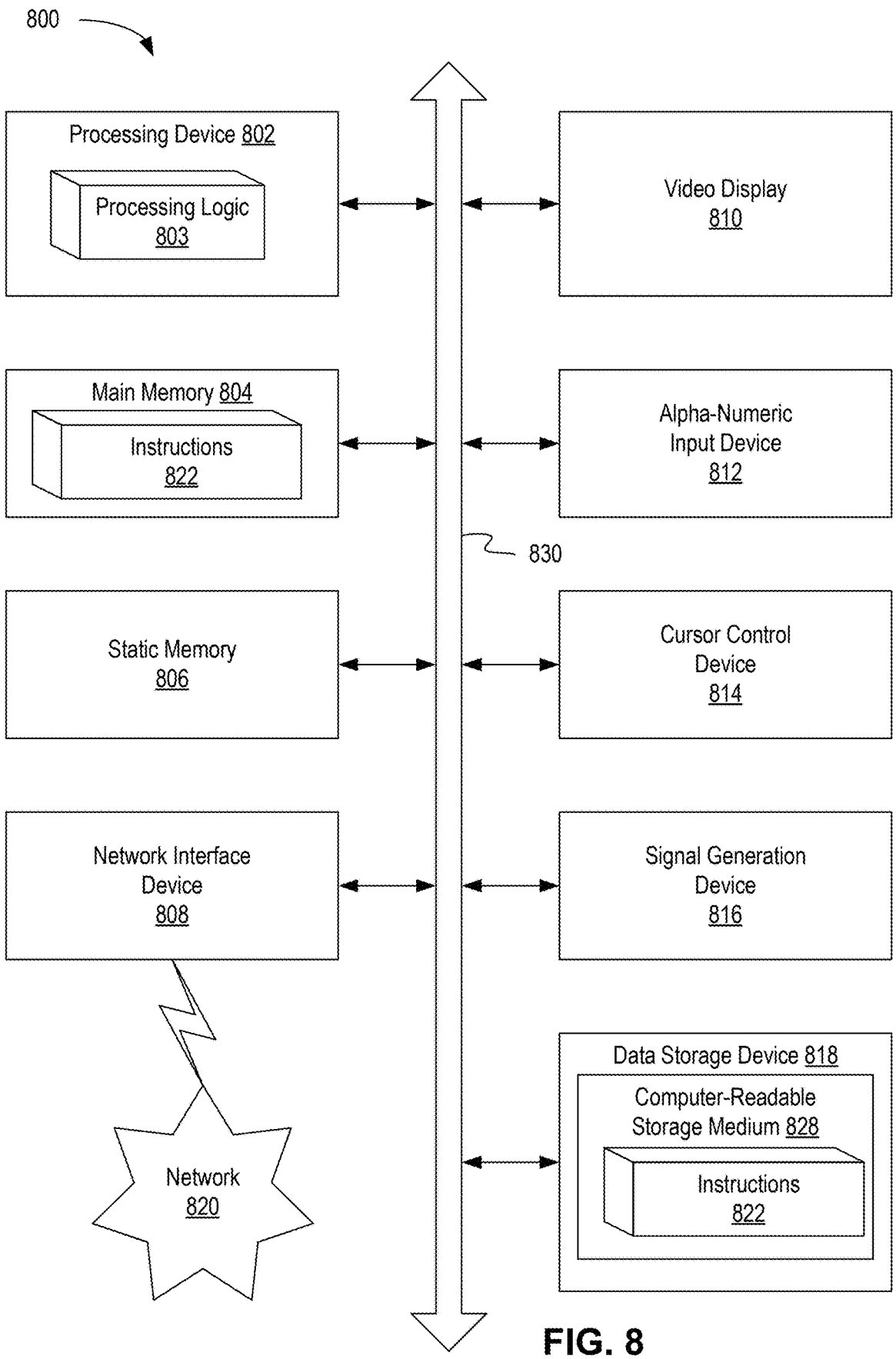
FIG. 8 depicts a block diagram of an example computer device capable of enabling fast and reliable object identification and tracking in autonomous driving environments, in accordance with some implementations of the present disclosure.

FIG. 8 depicts a block diagram of an example computer device 800 capable of enabling fast and reliable object identification and tracking in autonomous driving environments, in accordance with some implementations of the present disclosure, in accordance with some implementations of the present disclosure. Example computer device 800 can be connected to other computer devices in a LAN, an intranet, an extranet, and/or the Internet. Computer device 800 can operate in the capacity of a server in a client-server network environment. Computer device 800 can be a personal computer (PC), a set-top box (STB), a server, a network router, switch or bridge, or any device capable of executing a set of instructions (sequential or otherwise) that specify actions to be taken by that device. Further, while only a single example computer device is illustrated, the term "computer" shall also be taken to include any collection of computers that individually or jointly execute a set (or multiple sets) of instructions to perform any one or more of the methods discussed herein.

Example computer device 800 can include a processing device 802 (also referred to as a processor or CPU), a main memory 804 (e.g., read-only memory (ROM), flash memory, dynamic random access memory (DRAM) such as synchronous DRAM (SDRAM), etc.), a static memory 806 (e.g., flash memory, static random access memory (SRAM), etc.), and a secondary memory (e.g., a data storage device 818), which can communicate with each other via a bus 830.

Processing device 802 (which can include processing logic 803) represents one or more general-purpose processing devices such as a microprocessor, central processing unit, or the like. More particularly, processing device 802 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 802 can also be one or more special-purpose processing devices such as an application specific integrated circuit (ASIC), a field programmable gate array (FPGA), a digital signal processor (DSP), network processor, or the like. In accordance with one or more aspects of the present disclosure, processing device 802 can be configured to execute instructions performing methods 600 and 700 of forming reliable camera-radar associations in autonomous vehicle applications.

Example computer device 800 can further comprise a network interface device 808, which can be communicatively coupled to a network 820. Example computer device 800 can further comprise a video display 810 (e.g., a liquid crystal display (LCD), a touch screen, or a cathode ray tube (CRT)), an alphanumeric input device 812 (e.g., a keyboard), a cursor control device 814 (e.g., a mouse), and an acoustic signal generation device 816 (e.g., a speaker).

Data storage device 818 can include a computer-readable storage medium (or, more specifically, a non-transitory computer-readable storage medium) 828 on which is stored one or more sets of executable instructions 822. In accordance with one or more aspects of the present disclosure, executable instructions 822 can comprise executable instructions performing methods 600 and 700 of forming reliable camera-radar associations in autonomous vehicle applications.

Executable instructions 822 can also reside, completely or at least partially, within main memory 804 and/or within processing device 802 during execution thereof by example computer device 800, main memory 804 and processing device 802 also constituting computer-readable storage media. Executable instructions 822 can further be transmitted or received over a network via network interface device 808.

While the computer-readable storage medium 828 is shown in FIG. 8 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus can be specially constructed for the required purposes, or it can be a general purpose computer system selectively programmed by a computer program stored in the computer system. Such a computer program can be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems can be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages can be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but can be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method comprising:

obtaining, by a processing device, radar data associated with a radar frame of a plurality of radar frames temporally spaced by a frame interval, wherein the radar frame is associated with a first timestamp and depicts a first object in an environment of an autonomous vehicle (AV);

obtaining, by the processing device, a camera image, wherein the camera image is associated with a second timestamp and depicts a second object in the environment of the AV, and wherein a difference between the first timestamp and the second timestamp does not exceed the frame interval;

processing, using a first machine-learning model (MLM), at least the radar data to obtain a first embedding vector associated with the first object;

processing, using a second MLM, at least the camera image to obtain a second embedding vector associated with the second object; and determining, using the first embedding vector and the second embedding vector, a prediction measure representing a likelihood that the first object depicted in the radar frame and the second object in the camera image correspond to a same object in the environment of the AV.

2. The method of claim 1, further comprising:

in view of the prediction measure indicating that the first object and the second object correspond to the same object, determining a state of motion of the object, wherein the state of motion comprises at least one of a speed of the object or a location of the object; and causing a driving path of the AV to be determined in view of the state of motion of the object.

3. The method of claim 1, wherein determining the prediction measure comprises:

processing, using a third MLM, a combined embedding comprising the first embedding vector and the second embedding vector.

4. The method of claim 3, wherein each of the first MLM and the second MLM comprises one or more convolutional neuron layers and wherein the third MLM comprises one or more fully-connected neuron layers.

5. The method of claim 3, further comprising:
processing, using a fourth MLM, a radar data to obtain a third embedding vector representing velocity of the first object,
wherein the combined embedding vector further comprises the third embedding vector.

6. The method of claim 5, wherein the third embedding vector further represents a location of the first object.

7. The method of claim 5, wherein the radar data is further associated with one or more additional radar frames of the plurality of radar frames, the one or more additional radar frames associated with respective timestamps that are different from the first timestamp.

8. The method of claim 4, wherein at least one of the first MLM, the second MLM, or the third MLM is trained using a Siamese neural network.

9. The method of claim 1, wherein the radar data comprises a two-dimensional projection of a three-dimensional radar data obtained for a region of the environment of the AV that includes the first object.

10. The method of claim 9, wherein processing at least the radar data to obtain the radar embedding associated with the first object comprises processing a combined image comprising the radar data and the camera image.

11. A method comprising:
obtaining, by a processing device, a radar data associated with a radar frame of a plurality of radar frames temporally spaced by a frame interval, the radar frames associated with a first timestamp and depicting a first object in a region of an environment of an autonomous vehicle (AV);
obtaining, by the processing device, a camera image associated with a second timestamp and depicting a second object in the region of the environment of the AV, wherein a difference between the first timestamp and the second timestamp does not exceed the frame interval;
processing, using a first machine-learning model (MLM), at least the radar data to obtain a first embedding vector associated with the first object;
processing, using a second MLM, at least the camera image to obtain a second embedding vector associated with the second object; and
determining, using the first embedding vector and the second embedding vector, that the first object in the radar frame and the second object in the camera image correspond to a common object in the environment of the AV;
determining, using the radar data, a speed and a location of the common object; and
causing a driving path of the AV to be determined in view of the speed and the location of the common object.

12. The method of claim 11, wherein determining that the first object in the radar frame and the second object in the camera image comprises:
processing, using a third MLM a combined embedding vector comprising the first embedding vector and the second embedding vector to determine a likelihood that the first object and the second object correspond to the common object in the environment of the AV.

13. The method of claim 12, wherein the radar data comprises velocity data for one or more objects in the environment of the AV, and wherein the combined embedding vector further comprises a third embedding vector obtained by:
processing, using a fourth MLM, the velocity data.

14. A system comprising a perception system of an autonomous vehicle (AV), the perception system to:
obtain radar data associated with a radar frame of a plurality of radar frames temporally spaced by a frame interval, wherein the radar frame is associated with a first timestamp and depicts a first object in an environment of the AV;
obtain a second camera image, wherein the camera image is associated with a second timestamp and depicts a second object in the environment of the AV, and wherein a difference between the first timestamp and the second timestamp does not exceed the frame interval;
process, using a first machine-learning model (MLM), at least the radar data to obtain a first embedding vector associated with the first object;
processing, using a second MLM, at least the camera image to obtain a second embedding vector associated with the second object; and
determining, using the first embedding vector and the second embedding vector, a prediction measure representing a likelihood that the first object depicted in the radar frame and the second object in the camera image correspond to a same object in the environment of the AV.

15. The system of claim 14, wherein the perception system of the AV is further to:
determine, in view of the prediction measure indicating that the first object and the second object correspond to the same object, a state of motion of the object, wherein the state of motion comprises at least one of a speed of the object or a location of the object; and
wherein the system further comprises:
a control system of the AV, communicatively coupled to the perception system, the control system to:
cause a driving path of the AV to be determined in view of the state of motion of the object.

16. The system of claim 14, wherein to determine the prediction measure, the perception system of the AV is to:
process, using a third MLM, a combined embedding vector comprising the first embedding vector and the second embedding vector.

17. The system of claim 16, wherein the perception system of the AV is further to:
process, using a fourth MLM, a radar data to obtain a third embedding vector representing velocity of the first object,
wherein the combined embedding vector further comprises the third embedding vector.

18. The system of claim 17, wherein the third embedding vector further represents a location of the first object.

19. The system of claim 17, wherein the radar data is further associated with one or more additional radar frames of the plurality of radar frames, each of the additional radar frames associated with respective timestamps that are different from the first timestamp.

20. The system of claim 14, wherein the radar data comprises a two-dimensional projection of a three-dimensional radar data that is (i) obtained for a region of the environment of the AV that includes a first object and (ii) overlaid on the camera image.

* * * * *